United States Patent [19]

Schneider et al.

[11] 4,365,045

[45] Dec. 21, 1982

[54] CRYSTALLINE OLEFIN BLOCK POLYMERS

[75] Inventors: Abraham Schneider, Overbrook Hills; Habet M. Khelghatian, Springfield, both of Pa.; Louise D. Hague, Wilmington, Del.; James L. Jezl, Swarthmore, Pa.

[73] Assignee: Standard Oil Company (Indiana), Chicago, Ill.

[21] Appl. No.: 424,819

[22] Filed: Jan. 11, 1965

Related U.S. Application Data

[63] Continuation-in-part of Ser. No. 90,173, Feb. 20, 1961, abandoned, which is a continuation-in-part of Ser. No. 816,714, May 29, 1959, abandoned.

[51] Int. Cl.³ ............................................. C08F 297/08
[52] U.S. Cl. ..................................... 525/247; 525/245; 525/323
[58] Field of Search ............... 525/322, 323, 324, 245, 525/247; 526/159, 348

[56] References Cited

U.S. PATENT DOCUMENTS

| | | | |
|---|---|---|---|
| 3,014,018 | 12/1961 | Natta | 526/159 |
| 3,051,690 | 8/1962 | Vandenberg | 260/88.2 |
| 3,067,183 | 12/1962 | Hagemeyer | 526/159 |
| 3,529,037 | 9/1970 | Hagemeyer | 525/323 |
| 3,798,288 | 3/1974 | McManimie | 525/323 |
| 3,970,719 | 7/1976 | Edmonds | 525/323 |

Primary Examiner—Paul R. Michl
Attorney, Agent, or Firm—Stephen L. Hensley; William T. McClain; William H. Magidson

EXEMPLARY CLAIM

1. A process for producing a block polymer which comprises contacting, under polymerizing conditions, propylene with a catalyst comprising a dispersion of solid particles of a metal subhalide wherein said metal is selected from the group consisting of the metals of Groups IVa, Va and VIa of the Periodic Table according to Mendeleeff and an activator therefor selected from the group consisting of metal alkyls, metal hydrides, metal borohydrides, aryl metal halides, and alkyl metal halides wherein said metal is selected from the group consisting of aluminum, zinc, beryllium, chromium, magnesium, lithium, sodium, potassium, and lead, in an inert hydrocarbon liquid reaction medium, whereby said propylene is polymerized to form a polymeric block, then contacting a second monomeric composition selected from the group consisting of ethylene and mixtures thereof with propylene, with said catalyst system under polymerizing conditions whereby said second monomeric composition polymerizes in the presence of the previously formed polymeric block as a linear extension thereto, the polymerization of propylene being performed in the presence of sufficient hydrogen to give a melt index suitable for melt processing of the resulting block polymer and the polymerization of said second monomeric composition being performed in the substantial absence of added hydrogen, terminating the polymerization reaction and separating from the reaction mixture a solid, substantially crystalline block polymer which is predominantly insoluble in said reaction mixture at polymerization temperature and comprises molecules consisting essentially of a single homopolymer block linearly connected to a single polymer block selected from the group consisting of an interpolymer block and a homopolymer block derived from a monomer different from that of the first-mentioned homopolymer block, said block polymer consisting essentially of 99.8 to 40 weight percent of propylene and 0.2 to 60 weight percent of ethylene.

10 Claims, No Drawings

CRYSTALLINE OLEFIN BLOCK POLYMERS

The present application is a continuation-in-part of application Ser. No. 90,173 filed Feb. 20, 1961, which in turn is a continuation-in-part of application Ser. No. 816,714 filed May 29, 1959, both of which applications are now abandoned.

This invention relates to the preparation of substantially crystalline block polymers from alpha-olefins and to the resulting novel polymers wherein the molecules consist essentially of a single section of one olefin homopolymer attached to a single section of another olefin homopolymer or a single section of another olefin interpolymer.

The preparation of homopolymers and of copolymers from alpha-olefins has heretofore been described. For promoting the polymerization it is known to employ a catalyst system comprising solid particles of a metal subhalide, wherein the metal is one selected from the metals of Groups IVa, Va, and VIa of the Periodic Table, dispersed in an inert hydrocarbon reaction medium. An activator for the metal subhalide is also used. A particularly effective catalyst system for obtaining solid polymers of alpha-olefins comprises $TiCl_3$ in combination with an aluminum alkyl activator such as aluminum triethyl. In the polymerization step the alpha-olefin, or a mixture of alpha-olefins if copolymers are to be prepared, is contacted with a dispersion of the catalyst particles in an inert liquid hydrocarbon reaction medium under polymerizing conditions effective to produce high molecular weight polymers. Anhydrous and oxygen-free conditions are used in the polymerization step since the catalyst becomes deactivated through contact with water or oxygen.

Polymers having highly crystalline structure by X-ray analysis can be prepared in the above-described manner from various alpha-olefins. For example, highly crystalline or isotactic polymers from propylene can readily be produced. The polymerization product generally contains some amount of amorphous or atactic polymers which are more soluble in hydrocarbon solvents than the crystalline polymers and, hence, can be separated therefrom, for example, by extraction with pentane at room temperature.

Polymers heretofore prepared by the foregoing procedure are useful in certain applications, but are not suitable for use in many other applications. Thus, a polymer may exhibit certain properties which are desirable for a particular application but be deficient with respect to certain other properties. For example, polyethylene is valuable in applications where low brittle point is desirable, but it has a relatively low melting point which renders it unsuitable for certain applications where both flexibility and resistance to boiling water are desired. Polyethylene also has a relatively low tensile strength. Crystalline or isotactic polypropylene, on the other hand, exhibits relatively high melting point and tensile strength, but it has a high brittle point which makes it unsuitable for certain applications where a low brittle point is needed. Also, polypropylene generally has a low impact strength which rules out its use for various applications. Random copolymers of ethylene and propylene do not appear to combine the best properties of each homopolymer, and also the presence of another olefin during the polymerization destroys the crystallinity otherwise observed in polypropylene prepared as above described.

The present invention provides a manner of preparing novel substantially crystalline block polymers whereby polymers can be tailor made to have numerous combinations of properties desirable for various applications. Combinations of properties useful for particular applications of the polymer product can be secured by appropriate selection of the permissible operating variables within the scope of the invention. In accordance with the invention, block polymers are prepared which have molecules consisting of a single section composed of a homopolymer of one alpha-olefin attached to the end of a second single section composed of a homopolymer of another alpha-olefin, or a random interpolymer of at least two alpha-olefins. The crystallinity of the block polymers of this invention [determined by X-ray analysis in the manner described by Natta et al., of "Atti Accad. Naz. Lincei, Rend. Classe sci, fis. mat. d nat.", 22, No. 1, pages 11-17 (1957)] is at least 25% and usually 50% or more.

Belgian Pat. No. 553,720 discloses the preparation of block polymers by means of a two-stage process and aluminum alkyl-titanium tetrachloride catalysts. However, it is necessary that a solution of the first homopolymer block in an inert solvent be formed as a consequence of the first stage of the block polymerization process, and that this solution formed in situ be mixed with a second monomer and polymerized to complete the block polymer, whereas in the preferred procedure of this invention one first prepares a polymeric block which is insoluble in the inert hydrocarbon medium utilized even at polymerization temperatures. A second distinction presented by the present invention resides in the fact that no crystalline polymers are disclosed by Belgian Pat. No. 553,720; the products disclosed therein are described as being rubbery or liquid materials which are predominately soluble in hydrocarbons. Indeed, a primary object of the foregoing patent is the preparation of an elastomer; for this reason it is indicated that it is necessary that at least one of the monomers be a diene or possess functional substitution in order that the ultimate product can be vulcanized. In contrast to this, the block polymers of the present invention are solid, substantially crystalline isotactic products which are predominately insoluble in the inert hydrocarbon reaction media disclosed. Finally, Belgian Pat. No. 553,720 is distinguished from the processes and products of the present invention in that it fails to disclose block polymers and polymerization processes therefor wherein each of the monomers used in preparing such products contain only a single double bond per molecule and which contain no functional substitution, i.e., chloride, bromide, etc.

In an embodiment of this invention, the linear block polymers of this invention are prepared by first polymerizing an alpha-olefin having 2 to 8 carbon atoms per molecule utilizing as the catalyst a dispersion, in an inert liquid hydrocarbon medium, of a metal subhalide of a Group IVa, Va, or VIa metal in combination with a polymerization activator to form a solid, substantially crystalline homopolymer block which is predominately insoluble in said reaction medium at the temperature at which polymerization is performed. Then the catalyst system containing the polymer block already formed is contacted, under polymerizing conditions and in the substantial absence of any of the first olefin in monomeric state, with another alpha-olefin of 2 to 8 carbon atoms to form the other section of the block polymer molecule.

In another embodiment of this invention, an alpha-olefin containing from 2 to 8 carbon atoms is polymerized in the presence of the foregoing catalyst system to form the foregoing type of a homopolymer block, following which a different alpha-olefin containing 2 to 8 carbon atoms, or a mixture of two or more of the same, is polymerized in the presence of the unpolymerized portion of the first olefin monomer to produce an interpolymer block attached to the homopolymer block as an integral part of the ultimate linear block polymer chain. A wide range of linear block polymers can be made in this manner and predetermined combinations of desirable properties for particular applications can be secured. This embodiment is preferred to that described above for making block polymers consisting of homopolymer blocks as improved impact and low temperature properties are obtained in accordance with the preferred embodiment in polymers containing a much smaller amount of the second monomer, or mixture of monomers. Moreover, the block polymers of the preferred embodiment retain these improved properties as the molecular weight thereof decreases, i.e. block polymers having higher Melt Indices; cf. Examples I through VII with Examples IX through XXII.

For convenience, the present invention is hereinafter largely described in terms of using titanium trichloride as the catalyst, and aluminum triethyl or diethyl aluminum chloride as the activator therefor, isooctane or n-hexane as the inert, liquid reaction medium, and propylene and ethylene as the alpha-olefins which can be employed. The process of the invention, however, is not limited to such specific materials. Other specific catalyst systems, monomers and process conditions necessary for the preparation of the block polymers of this invention are illustrated by pages 350 through 367 of "Linear and Stereoregular Addition Polymers" by Norman G. Gaylord and Herman F. Mark, Interscience Publishers, 1959, the contents of which are incorporated herein by reference.

While one procedure has been set forth herein with specific reference to the polymerization of ethylene followed by propylene, the invention preferably embraces the preparation of block polymers from propylene followed by ethylene. It is directed, moreover, to the preparation of block polymers from any two different alpha-olefins of 2 to 8 carbon atoms reacted in either order, provided that the alpha-olefins selected do not have a side chain substituent connected to the beta carbon atom. The combination of properties obtained in the product will depend upon the particular olefins selected, the order of reacting them, the proportions thereof incorporated in the block polymer product, and the reaction conditions chosen. The polymer products obtained accordingly can be tailor made for a variety of applications requiring different physical characteristics.

Thus this invention provides, on the one hand, block polymers consisting essentially of a block of a homopolymer of one alpha-olefin linearly bonded to a block of a homopolymer of a different alpha-olefin, e.g., a polymer having the formula:

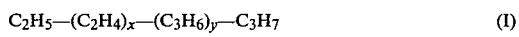

$$C_2H_5-(C_2H_4)_x-(C_3H_6)_y-C_3H_7 \qquad (I)$$

wherein x and y are whole numbers. In order to prepare a polymer of type (I), it is necessary to polymerize the second alpha-olefin in the substantial absence of the unpolymerized first alpha-olefin. On the other hand, it is sometimes preferable to prepare a polymer containing a first block of an alpha-olefin homopolymer terminally bonded to a second block of an interpolymer of two or more alpha-olefins, e.g., a polymer having the formula:

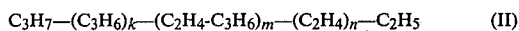

$$C_3H_7-(C_3H_6)_k-(C_2H_4\cdot C_3H_6)_m-(C_2H_4)_n-C_2H_5 \qquad (II)$$

wherein k, m, and n are whole numbers.

Since ethylene is not soluble in large quantities in the hydrocarbon reaction media, the polymer consisting essentially of homopolymer blocks illustrated by (I) is prepared with some facility by polymerizing ethylene first at elevated pressure to produce the predominately insoluble polymer block described herein, followed by venting to a lower pressure and polymerizing a second alpha-olefin to produce a polymer consisting essentially of two homopolymer blocks which is predominately insoluble also. On the other hand, since propylene is so much more soluble in the hydrocarbon reaction media, some of it remains therein after venting and purging, resulting in the production of some of product I and some of which consists of a polymer made up of a homopolymer block of propylene terminally connected to a copolymer block of ethylene and propylene; i.e. product (II) wherein n approaches or equals 0.

The polymeric product illustrated by (II) is generally produced according to this invention by each of two methods. In one illustrative embodiment, (A), propylene is polymerized first to produce a predominately insoluble homopolymer block; the reactor is then vented to a lower pressure and purged with nitrogen to remove as much of the unreacted propylene as is practicable. Ethylene is then introduced to complete the reaction, resulting in a predominately insoluble block polymer (II) wherein n is a larger whole number than m. In a second embodiment, (B), propylene is polymerized to produce a predominately insoluble homopolymer block, then with little or no venting or purging, ethylene is introduced to produce a predominately insoluble block polymer (II) wherein m is a larger whole number than n. In a modification of (II-B), a mixture of ethylene and propylene is polymerized to produce a copolymer block which may, or may not, be soluble in the reaction medium at polymerization temperature; the reactor is vented and purged to remove unreacted ethylene, if any, and more propylene is introduced to produce a homopolymer block resulting in a block polymer (II) wherein m is a larger whole number than n, in fact wherein n usually approaches zero, which block polymer is predominately insoluble in the reaction medium at polymerization temperature. This latter product embodiment wherein n approaches or equals 0 may also be achieved by first polymerizing propylene to provide a homopolymer block, following which a mixture of propylene and ethylene are polymerized to provide a copolymer block. Examples of other alpha-olefins, i.e., olefins which can be used in the present invention to produce block polymer (I) or (II) are butene-1, 3-methylbutene-1, 3,3-dimethylbutene-1, 4-methylpentene-1, 3,4-dimethylhexene-1, allyl-benzene, styrene, and the like.

In general, the products of the invention contain between 0.2 and 60 weight percent of ethylene and correspondingly between 99.8 and 40 weight percent of propylene. When proceeding according to embodiment (I), particularly useful products are obtained wherein the weight proportion of ethylene:propylene in the product is in the range of from 3:97 to 60:40, preferably from 10:90 to 35:65. On the other hand, when proceeding in accordance with embodiment (II-A), the ethylene:propylene weight proportion is generally in the range of from 3:97 to 50:50, preferably 10:90 to 35:65. When embodiment (II-B) is followed, the weight proportion of ethylene:propylene in the product is generally in the range of from 0.2:99.8 to 20.80, preferably from about 0.2:99.8 to 8.92; as increased ethylene contents frequently result in increased quantities of hydrocarbon-soluble amorphous materials, it is most preferable that the ethylene content not substantially exceed 6 weight percent. Polymers prepared in this manner have excellent characteristics, including low brittle points and high impact and tensile strengths.

Block polymers prepared by the present process are distinctly different from copolymers made from the same monomers, i.e., polymers produced by reacting a pair of monomers in admixture with each other. For example, random copolymers of ethylene and propylene are generally amorphous rubbery materials which are largely soluble in boiling heptane, while the block polymers of ethylene and propylene made as herein described are solid highly crystalline materials which are mainly insoluble in boiling heptane, the latter property being indicative of their substantial isotacticity. The present polymers also differ substantially from block type polymers made by polymerizing each monomer successively but alternating the monomer reactions a plurality of times so that the polymer molecule is made up of a number of alternate sections instead of only two sections as in the present case (product II as illustrated shows as many as three blocks; only the first two are significant, the third if present at all occurs as an impurity). When the polymer contains multiple alternate sections, the product tends to have lower crystallinity and less strength, and desirable properties of the present polymers are not obtained. Moreover, the block polymers of this invention are distinct from physical mixtures of their polymeric components.

The preferred catalyst system for use in the present process is a dispersion, in an inert organic liquid reaction medium, of particles of $TiCl_3$ in combination with an aluminum alkyl activator. The reaction medium preferably is an inert hydrocarbon or mixture of hydrocarbons, for example, hexanes, heptanes, octanes, cyclopentanes, cyclohexanes, benzene, toluene, xylenes, decalin and the like. Nonterminal olefins which will not react under the conditions employed during the reaction can also be used. The aluminum alkyl activator can be any aluminum alkyl wherein the alkyl groups each have 1-10 carbon atoms. The aluminum alkyl compound preferred is diethyl aluminum monochloride; however, trialkyls such as triethyl, trimethyl, triisobutyl, triisoctyl, and tridecyl compounds of aluminum, as well as the corresponding dialkyl halides thereof, can be used with good results. The amount of $TiCl_3$ that should be employed generally should be in the range of about 0.01 to 20 g. per liter of the inert liquid reaction medium, preferably 0.05 to 1.0 g. per liter. The molar ratio of the aluminum activator to $TiCl_3$ compound generally should be in the range of 0.2 to 10 and more preferably 0.5 to 2.5.

Temperatures at which the polymerization reactions are carried out in the present process generally are in the range of 30°–250° F. and more preferably 70°–180° F. The temperature level selected for each polymerization stage is a factor that influences the properties of the products obtained. The same or different temperatures can be employed in the two reaction stages and variations in product properties thereby can be obtained. With a monomer which is readily polymerizable such as ethylene, a relatively low reaction temperature can be employed, e.g., as low as 30° F.; whereas with a less easily polymerizable monomer, such as propylene, it is desirable to use a higher temperature, e.g., 120°–175° F., in order to secure a reasonable reaction rate. The pressure in the reactor will depend upon the particular monomer, or mixtures of monomers, being polymerized and the reaction temperature selected. It may generally vary from atmospheric pressure to 500 psig or higher, practical considerations dictating a pressure in the range from about 75 to 180 psig.

In a further embodiment of the invention which can be utilized when it is desired to secure an increase in the melt index of the polymer product, one or both of the polymerization stages is carried out in the presence of added hydrogen. For examples, ethylene is polymerized in the absence of hydrogen and thereafter propylene is polymerized with hydrogen being present in the reactor. The amount of hydrogen that should be added generally should be sufficient to produce a polymer having a melt index of between 0.1 and 10, preferably between 0.3 and 5.0, ideally between 0.5 and 4. Usually quantities of hydrogen in the range of about 5 to 100 ppm, preferably 10 to 50 ppm, based on the weight of solvent are used. The presence of the hydrogen causes the product to have a higher melt index so that it can be molded or cast more readily. This is secured, however, at the expense of certain other properties, particularly the impact strength and percent elongation at break which are considerably lowered. However, for applications where these properties are not particularly important while a higher melt index is desirable, practice of the invention with the use of hydrogen during one or both of the polymerization stages is advantageous.

It has been unexpectedly found, however, that when propylene is polymerized first in the presence of hydrogen, followed by polymerizing of ethylene in the substantial absence of hydrogen, higher melt indices are obtained without lowering either the impact strength or the elongation at break. Moreover, it is possible to obtain higher yield tensile strengths when proceeding according to this latter mode of operation than when the former mode of operation is used. Furthermore, the latter method provides another unexpected advantage in that more efficient heat transfer is obtained. Thus, when one polymerizes ethylene followed by propylene, a tenacious coating of polyethylene forms on the walls of the reactor which prevents efficient heat transfer from the contents of the reactor to the cooling medium, usually water, in the jacket surrounding the reactor, causing localized hot spots which result in the formation of a more heterogeneous product. These results do not obtain when propylene is polymerized first in the manner described above.

The examples given below will serve to illustrate the invention more specifically. Test values given in the examples and also such values mentioned hereinafter in some of the claims are obtained by the following methods: brittle point—A.S.T.M. Method D-746-57T; Izod impact strength—A.S.T.M. Method D-256-56; yield strength, break strength and elongation at break—A.S.T.M. Method D-638-58T using rate of one inch per minute. Heat distortion values are determined by a modification of A.S.T.M. Method D-648-56 using a specimen having a thickness of 0.120–0.140 inch and a width of about 0.500 inch. Melt index values are determined by a modification of A.S.T.M. Method D-1238-57T using a temperature of 230° C. and a load of 2160 g. These test values are from compression moldings except where otherwise specified. With the exception of percent elongation, all percents are by weight.

EXAMPLE I

A catalytic system was prepared comprising a dispersion in an isooctane alkylate of finely divided $TiCl_3$ in combination with $(C_2H_5)_3Al$. The dispersion contained 0.25 g of $TiCl_3$ per 100 ml. of alkylate, and the molar ratio of the $TiCl_3$ to $(C_2H_5)_3Al$ was 1:1. With the mixture at about 77° F., ethylene was added to the reactor to a pressure of about 27 psig and the mixture was stirred for a 10 minute reaction period. During this time the temperature increased to about 91° F. due to the heat of reaction. The reactor was then vented, nitrogen was added under pressure and the reactor was again vented. Such alternate repressuring and depressuring was done several times in order to insure removal of any unreacted ethylene. Propylene was then added in amount such that the propylene concentration in the alkylate was about 19% on a molar basis. The mixture was heated to about 160° F. and reacted for about 95 minutes under a pressure of 52 psig. During this period the mixture was continuously stirred and additional propylene was added to maintain the pressure at about 52 psig and the monomer concentration at about 19%. Under the foregoing conditions, the amounts of ethylene and propylene consumed were such that the ethylene constituted about 14% by weight of the polymerization products. At the end of the propylene polymerization period methanol was added to deactivate the catalyst. Thereafter, the reaction mixture was filtered, and the solid polymer was repulped with methanol, and again separated by filtration. The resulting wet cake was extracted with pentane to remove methanol and pentane-soluble polymers and was then dried. The amount of pentane-soluble polymer was determined by evaporating the solvent from the filtrate. The amount of heptane-insoluble polymer in the pentane-insoluble product also was determined by extracting a sample thereof with heptane in a Soxhlet extractor.

For comparison purposes a control run was made with propylene alone under substantially the same conditions as used in the propylene polymerization stage described above. Also, another comparison run was made to yield a product which was composed of 12% ethylene and 88% propylene, but in which most of the propylene was present in the form of separate homopolymer. The latter was done by first reacting the ethylene in a system containing 0.028 g. of $TiCl_3$ per 100 ml. of alkylate and containing $(C_2H_5)_3Al$ in a mol ratio to the $TiCl_3$ of 2:1, and thereafter adding new catalyst to the system in increased amount such that it contained 0.22 g. of $TiCl_3$ per 100 ml. of alkylate and the $(C_2H_5)_3Al$ to $TiCl_3$ ratio was 1:1.

The foregoing three runs are designated as Runs A, B, and C respectively in Table I.

TABLE I

| | Run A | Run B | Run C |
|---|---|---|---|
| % Ethylene inn products | 14 | 0 | 12 |
| % Pentane-soluble polymer | 26 | 17 | 14 |
| PENTANE-INSOLUBLE PRODUCT | | | |
| production rate, lbs./gal./hr. | 0.40 | 0.24 | 0.23 |
| % heptane-insoluble | 96 | 95 | 92 |
| yield strength, psi | | | |
| @ 1 in./min. | 3585 | 4125 | 3950 |
| breaking strength, psi | | | |
| @ 1 in./min. | 5285 | 5915 | <3950 |
| Izod impact strength, ft. lbs./in. | 15.9 | 0.36 | 0.52 |
| brittle point, °F. | 26 | 67 | 77 |
| % elongation at break | 532 | 755 | 536 |
| melt index | 0.07 | 0.18 | 0.13 |
| heat distortion, °F. | 127 | 122 | 117 |

These results show that operation in accordance with the invention (Run A) yields a block polymer which has a considerably higher impact strength and a substantially lower brittle point than polypropylene homopolymer (Run B). These properties render the block polymer useful in certain applications in which polypropylene itself is unsatisfactory. While the tensile yield strength of the block polymer is somewhat lower than that of polypropylene, it is still sufficiently high for many applications such as in the preparation of molded articles, film and fibers. The data also show that operating according to the invention gives a substantially increased rate of polymer production.

EXAMPLE II

Another run (Run D) was made in the manner described for Run A above, but the amount of ethylene incorporated in the product was reduced to 7% by weight. The pentane-insoluble product had about the same yield strength, percent elongation and heat distortion as in Run A, but the brittle point increased to 37° F., melt index increased to 0.163, and impact strength decreased to 8.9.

EXAMPLE III

A series of runs were made in which both the ethylene and propylene were successively polymerized at about 160° F. Varying amounts of ethylene were used, with the conditions otherwise being as described for Run A. The data obtained thereby are shown in Table II.

TABLE II

| | Run E | Run F | Run G |
|---|---|---|---|
| % Ethylene in products | 24 | 32 | 59 |
| % Pentane-soluble polymer | 9 | 13 | 9 |
| PENTANE-INSOLUBLE PRODUCT | | | |
| production rate, lbs./gal./hr. | 0.30 | 0.31 | 0.96 |
| % heptane-insoluble | 96 | 94 | 96 |
| yield strength, psi | | | |
| @ 1 in./min. | 3620 | 3490 | 3210 |
| breaking strength, psi | | | |
| @ 1 in./min. | 5475 | — | 4795 |
| Izod impact strength, ft. lbs./in. | >14 | >16 | >16 |
| brittle point, °F. | 12 | −31 | <−60 |
| % elongation at break | 615 | 478 | 454 |
| melt index | 0.04 | 0.03 | 0.00 |
| heat distortion, °F. | 111 | 127 | 106 |

These results show that the effect of increasing the ethylene content of the polymer is to decrease the tensile yield strength and melt index and also to decrease the brittle point sharply.

EXAMPLE IV

The data tabulated in Table III were obtained in runs in which propylene is polymerized first at 160° F. and thereafter the ethylene is polymerized. In Runs H and J the ethylene polymerization stage was done at 80° F. while in Run K it was done at about 160° F.

TABLE III

|  | Run H | Run J | Run K |
|---|---|---|---|
| % Ethylene in products | 22 | 30 | 56 |
| % Pentane-soluble polymer | 13 | 10 | 8 |
| PENTANE-INSOLUBLE PRODUCT | | | |
| production rate, lbs./gal./hr. | 0.34 | 0.19 | 0.65 |
| % heptane-insoluble | 95 | 93 | 94 |
| yield strength, psi @ 1 in./min. | 2945 | 2665 | 3175 |
| breaking strength, psi @ 1 in./min. | 5195 | 4670 | 4850 |
| Izod impact strength, ft. lbs./in. | >14 | >16 | 17 |
| brittle point, °F. | 3 | <−60 | <−60 |
| % elongation at break | 574 | 522 | 502 |
| melt index | 0.057 | 0.021 | 0.007 |
| heat distortion, °F. | 115 | 111 | 104 |

EXAMPLE V

A block polymer was prepared by polymerizing ethylene at 160° F. and then polymerizing propylene at the same temperature in the presence of hydrogen added in amount of 60 ppm based on the weight of solvent in the reactor. The polymerization products contained 27% ethylene by weight. The pentane-insoluble product had the following properties: melt index=0.55; yield strength=3580; elongation at break=52%; brittle point=48° F.; impact strength=0.36; heat distortion=126° F. Comparison of these results with those in Runs E and F shows that the presence of 60 ppm of hydrogen during the propylene polymerization under the foregoing conditions substantially raises the melt index, but also raises the brittle point and sharply lowers the impact strength. The product, however, has a lower brittle point and a substantially higher melt index than polypropylene itself (Run B).

EXAMPLE VI

Another run was made under the conditions described for Run A except that the propylene polymerization step was carried out in the presence of added hydrogen in amount of 30 ppm based on the weight of alkylate. The polymerization products contained 16% ethylene by weight. The pentane-insoluble product had the following properties: melt index=0.07; yield strength=3840; breaking strength=5400; elongation at break=510%; brittle point=19° F.; impact strength=>14; heat distortion=124° F. Comparison of these results with those in Run A indicates that the use of hydrogen at the 30 ppm level during the propylene polymerization step caused increases in yield and breaking strengths and a decrease in brittle point, with the other properties being about the same.

EXAMPLE VII

Two other runs were made under conditions described for Run A except that in the first run hydrogen in amount of 15 ppm was used during the propylene polymerization stage, and in the second hydrogen was used in both the ethylene and propylene stages in amounts, respectively, of 5 ppm and 15 ppm. The molar proportion of ethylene incorporated in the product in each case was 15%. The pentane-insoluble product from the first run had a yield strength of 3536 and a brittle point of 40° F., while that from the second run had a yield strength of 3710 and a brittle point of 7° F. These results show that the use of hydrogen in the ethylene stage as well as in the propylene stage helps to increase yield strength and lower brittle point below that of polypropylene.

EXAMPLE VIII

A polymer product containing about 14.5% ethylene was made by alternately polymerizing ethylene (E) and propylene (P), each at 160° F., several times. The precise order of reaction was as follows: EPEPEPEP. In each step about one fourth of the total amount of either the ethylene or the propylene was reacted. The pentane-insoluble product had a brittle point of 22° F., a yield strength of 3290, an impact strength of 3.3, and an elongation at break of 327%. Comparison of these results with those for Run A shows that alternating the polymerization stages several times is detrimental to the strength characteristics of the product. Polymers made so that the molecules have only two block sections (Run A) have higher yield and impact strengths and better elongation characteristics than those made in accordance with the present example.

EXAMPLE IX

To a 50 gallon jacketed stirred reactor are added 25 gallons of hexane, 45.4 g. of titanium trichloride, and a solution of 53.07 g. of diethyl aluminum chloride in 0.7 gallon of hexane resulting in a catalyst slurry in the hexane. About 8.3 ppm of hydrogen, based on the weight of the hexane, and sufficient propylene are then added to bring the pressure from 0 psig to 100 psig. Polymerization begins immediately, the temperature rising to 160° F. at which point it is maintained throughout the reaction by the cooling water circulating in the jacket. Propylene is continuously added to the reactor to maintain the foregoing pressure. An additional 8.3 ppm of hydrogen based on the weight of the hexane are added to the reactor after about 20 pounds of propylene have been added thereto, and the same quantity of hydrogen is added after about 40 pounds of propylene have been added thereto. After 60.5 pounds of propylene have been added to the reactor, the reactor is vented to 5 psig to remove substantially all of the hydrogen and propylene from the vapor space in the reactor (dissolved propylene remains in liquid hexane). Ethylene is then introduced into the reactor causing the temperature to increase to 165° F. Polymerization is continued at this temperature and at a pressure between 5 and 10 psig by continuous addition of ethylene until 6 pounds thereof have been added to the reactor, whereupon the catalyst is deactivated and the product is recovered in the manner described in Example I. The various test values for the product recovered are obtained from injection moldings and are tabulated in Table IV.

EXAMPLE X

The procedure of Example IX is repeated with the exception that 10 pounds of ethylene are used during the reaction, the various test values therefor appearing in Table IV.

TABLE IV

| Pentane Insoluble Polymer | Example IX | Example X |
|---|---|---|
| ethylene content* | 15% | 19% |
| melt index | 0.5 | 0.4 |
| yield strength | 5270 psi | 4650 psi |

TABLE IV-continued

| Pentane Insoluble Polymer | Example IX | Example X |
|---|---|---|
| elongation | 220% | 310% |
| brittle point | 14° F. | 12.5° F. |
| Izod impact | 15.8 (ft. lbs./in.) | 16.2 (ft. lbs./in.) |
| Modulus | 151,900 | 140,000 |

*Determined as crystalline polyethylene by measurement of infra-red adsorption of a 10 mil film at 13.9 microns in accordance with Method II described in "Preprints of Papers of the Division of Polymer Chemistry", April 1960, Vol. 1, No. 1, pages 325 to 330, by P. E. Wei.

The better properties obtained according to Table IV as contrasted with Table III H and J are a result of better process control and the improvement realized when test values are obtained from injection moldings in Table IV versus compression moldings in Table III.

EXAMPLE XI

To a 2 gallon stainless steel jacketed stirred reactor are added 5,480 cc of hexane, 9.2 cc of a hexane solution containing 17% by volume of aluminum diethyl chloride, 25 ppm hydrogen, and 2,120 cc of propylene. Upon addition of 0.96 g. of titanium trichloride in 2.88 g. of mineral oil, polymerization begins, the temperature rising to 160° F. at which point it is maintained throughout the reaction by a circulation of cooling water in the jacket. Propylene is continuously added to the reactor throughout the reaction in order to maintain the pressure at about 160 psig. During the reaction an additional 1,060 cc of propylene are added to the reactor. After all of the propylene has been added to the reactor, the polymerization reaction is continued until the pressure drops 2 psi, whereupon ethylene is introduced into the reactor and the polymerization continues. Sufficient ethylene is continuously added throughout this stage of the polymerization to maintain the pressure at the foregoing operating level (i.e., about 160 psig), with a total of 49 grams of ethylene being so introduced. After all of this quantity of ethylene has been introduced into the reactor, the polymerization is continued for 2 minutes, whereupon the catalyst is deactivated and the polymer recovered in the manner described in Example I.

EXAMPLE XII

The polymerization reaction of Example XI is repeated with the exception that after all of the propylene has been introduced, the polymerization reaction is continued until the pressure drops 5 psi, at which point the reactor is vented until the pressure drops an additional 35 psi. Then additional propylene is introduced to increase the pressure by 40 psi; propylene polymerization is then continued until the pressure drops 3 psi, whereupon ethylene is introduced and polymerized causing the pressure to increase to 175 psig, a total of 48 grams thereof being added. After all of the ethylene has been introduced, the polymerization of ethylene is continued for an additional 30 minutes, at which point the catalyst is deactivated and the polymer recovered in the same manner as described in Example I.

EXAMPLE XIII

The procedure of Example XI is repeated except that 18 ppm of hydrogen are used, polymerization takes place at 170 psig, 52 grams of ethylene are added and the polymerization reaction is continued for 20 minutes after all of the ethylene has been introduced.

EXAMPLE XIV

The procedure of Example XII is repeated with the exception that the pressure drop when vented is 25 psi; after adding sufficient propylene to increase the pressure to 160 psig, propylene polymerization is again conducted until the pressure drops 2 psi whereupon sufficient ethylene is introduced to increase the pressure to, and maintain the pressure at, about 160 psig, the quantity of ethylene added being 52 grams, and the period during which polymerization is continued after all of the ethylene has been added being 20 minutes.

The physical properties for the polymers prepared according to each of Examples XI, XII, XIII, and XIV are tabulated in Table V.

TABLE V

| | Total Product | | Pentane Insoluble Polymer | | |
|---|---|---|---|---|---|
| Example | % Ethylene* | % Pentane Soluble | % Heptane Insoluble | Melt Index | Izod Impact (ft.-lbs./in.) |
| XI | 0.2 | 28.8 | 92.1 | 0.36 | 15.6 |
| XII | 3.0 | 28.5 | 93.2 | 0.20 | 14.6 |
| XIII | 6.0 | 32.0 | 93.9 | 0.28 | 13.2 |
| XIV | 5.0 | 34.1 | 90.8 | 0.27 | 11.9 |

*Calculated by determining difference between weight of ethylene charged to the reactor and that remaining therein at termination of the reaction.

EXAMPLE XV

The procedure of Example XI is repeated with the exception that 22 ppm of hydrogen are used, operating pressure is 165 psig, 52 grams of ethylene are used, and the polymerization is continued for 3 minutes after all of the ethylene has been introduced.

EXAMPLE XVI

The procedure of Example XI is repeated with the exception that operating pressure is 163 psig, 52 grams of ethylene are added, and the polymerization is continued for 20 minutes after all of the ethylene has been introduced.

EXAMPLE XVII

The procedure of Example XII is repeated with the exception that operating pressure is 168 psig, 30 ppm of hydrogen are used; after sufficient propylene has been added after venting to increase the pressure to 170 psig, polymerization is continued until the pressure drops 2 psi whereupon ethylene is added, a total of 51 grams thereof being added to maintain the operating pressure, and the polymerization reaction is continued for 20 minutes after all of the ethylene has been introduced.

EXAMPLE XVIII

The procedure of Example XV is repeated with the exception that the operating pressure is 173 psig and the polymerization reaction is continued for 5 minutes after all of the ethylene has been introduced.

EXAMPLE XIX

The polymerization reaction of Example XVIII is repeated with the exception that the operating pressure is 171 psig and 51 grams of ethylene are added.

The physical properties for the polymers prepared according to each of Examples XV, XVI, XVII, XVIII, and XIX are tabulated in Table VI.

TABLE VI

| Example | Total Product % Ethylene* | Pentane Insoluble Polymer | | | |
|---|---|---|---|---|---|
| | | % Pentane Soluble | % Heptane Insoluble | Melt Index | Izod Impact (ft.-lbs./in.) |
| XV | 0.2 | 28.0 | 92.8 | 0.97 | 14.3 |
| XVI | 3.0 | 26.2 | 92.3 | 0.81 | 8.6 |
| XVII | 4.0 | 25.2 | 93.5 | 0.52 | 8.0 |
| XVIII | 4.0 | 15.1 | 95.3 | 0.99 | 3.9 |
| XIX | 3.0 | 23.4 | 93.0 | 1.56 | 7.0 |

*Calculated by determining difference between weight of ethylene charged to the reactor and that remaining therein at termination of the reaction.

EXAMPLE XX

Three hundred and seventy-five grams of the product prepared in Example XI, 425 grams of the product prepared in Example XII, 383 grams of the product prepared in Example XIII, and 534 grams of the product prepared in Example XIV were combined in a Waring blender, the various test data for the composite being tabulated in Table VII.

EXAMPLE XXI

Three hundred and seventy-nine grams of the product prepared in Example XV, 392 grams of the product prepared in Example XVI, 282 grams of the product prepared in Example XVII, 543 grams of the product prepared in Example XVIII, and 220 grams of the product prepared in Example XIX were combined in a Waring blender and various test data of this composite were determined.

The test data appearing in Table VII were obtained from injection moldings of the composite products of each of Examples XX and XXI.

EXAMPLE XXII

Sixty-five parts of polypropylene powder having a melt index of 3.3 were blended with 35 parts polyethylene powder having a molecular weight of 1,700,000 to produce an intimate mixture thereof. When injection moldings thereof are compared with the block polymers of Examples IX, X, XX and XXI, significant advantages are shown for the polymers of this invention as shown in Table VII. Whereas the polymers of Examples IX, X, XX and XXII contain respectively 15%, 19% and about 1% ethylene, 35% polyethylene must be blended with polypropylene to achieve a brittle point similar to those of said examples. In addition, the percent elongation of the blend of Example XXII is drastically lower than those of the polymers of this invention; cf. Examples IX, X, XX and XXI with XXII. Moreover, the Izod impacts of the block polymers of Examples IX, X, XX and XXI are at least 300% of that of the blend of Example XXII.

TABLE VII

| Pentane Insoluble Polymer | Example IX | Example X | Example XX | Example XXI | Example XXII |
|---|---|---|---|---|---|
| melt index | 0.5 | 0.4 | 0.4 | 0.7 | 0.5 |
| yield strength | 5270 psi | 4650 psi | 3930 psi | 3930 psi | 4660 psi |
| % elongation | 220 | 310 | >622* | >622 | 70 |
| brittle point | 14° F. | 12.5° F. | 13° F. | 14.9° F. | 13° F. |
| Izod impact (ft. lbs./in.) | 15.8 | 16.2 | 16.6 | 15.7 | 5.1 |
| ethylene content** | 15% | 19% | ~1% | ~1% | 35% |

TABLE VII-continued

| Pentane Insoluble Polymer | Example IX | Example X | Example XX | Example XXI | Example XXII |
|---|---|---|---|---|---|
| modulus | 151,900 | 140,000 | 120,400 | 109,400 | 148,100 |

*Limit of the apparatus
**Same method as Table IV

From the foregoing examples it is apparent that the present invention provides block polymers having a wide range of properties suitable for various uses. It is especially useful in providing block polymers having the following desirable combination of properties: brittle point generally below 40° F., preferably below 30° F.; Izod impact strength of at least 3.5 ft.lbs./in., usually at least 6 ft.lbs./in. and preferably 12 ft.lbs./in. or higher; and tensile yield strength of at least 3,000 psi at 1 in./min. and preferably above 3,500 psi at 1 in./min. Other alpha-olefins having 2 to 8 carbon atoms per molecule and which do not contain a side chain substituent connected to the beta unsaturated carbon atom can be substituted for either the ethylene or propylene or both. However, it is generally preferable in practicing the invention to employ propylene as one of the two monomers and to react propylene first and thereafter react the other alpha-olefin or mixtures of two or more alpha-olefins.

Although the process of the invention has been described largely in terms of using titanium trichloride as the catalyst and aluminum triethyl as the activator, other metal subhalides and other activators can be employed. By "metal subhalide", and terms of similar import, is meant a metal halide in which the valence of the metal is less than its maximum value. The subhalides of the metals of Groups IVa, Va, and VIa of the Periodic Table according to Mendeleeff can be used as the solid catalyst; for example, a subhalide of zirconium, chromium, vanadium, molybdenum, or titanium can be used. Specific examples are vanadium trichloride, zirconium trichloride, chromium dichloride, molybdenum tetrachloride, and the bromide, iodide, and fluoride analogues thereof. Such metal subhalides can be prepared by any convenient means. For example, titanium trichloride can be prepared by reducing titanium tetrachloride as by means of an aluminum trialkyl agent, or by other reducing means such as by contacting the metal compound with a dispersion of an alkali metal in an inert solvent, or by contacting with hydrogen at an elevated temperature. It is necessary, however, that an activator, such as an aluminum trialkyl or aluminum alkyl halide, be present as a component of the catalyst system, and it is convenient in many instances to employ such a compound as both the reducing agent and activator. However, the use of a prereduced compound, such as $TiCl_3$, together with an activator, gives excellent results.

Materials which can be used as the activator, in addition to aluminum trialkyls, include other metal alkyls, metal hydrides, metal borohydrides, and alkyl metal halides. Suitable metal alkyls include alkyl derivatives of aluminum, zinc, beryllium, chromium, magnesium, lithium, and lead. Aluminum triethyl, aluminum triisopropyl, aluminum triisobutyl, and the magnesium and zinc analogues thereof give good results in the process, but metal alkyls having up to about 10 carbon atoms in the alkyl groups can be used. Alkali metal alkyls such as n-butyllithium, methylsodium, butylsodium, phenylisopropylpotassium, and the like, also illustrate metal alkyls that can be employed in the process. Metal hydrides which can be used as polymerization activators include, for example, lithium hydride, lithium aluminum hydride, and sodium hydride. Metal borohydrides such as sodium borohydride and potassium borohydride illustrate the borohydrides which can be employed. Alkyl metal halides which can be used are Grignard reagents such as methylmagnesium bromide, ethylmagnesium chloride, phenylmagnesium bromide, and the like. Catalysts combinations of TiCl$_3$ and alkyl aluminum halides, such as diethyl aluminum chloride, are preferred as they provide much higher yields of hydrocarbon-insoluble linear block polymers than other catalyst systems.

The quantities of these catalytic components can be varied considerably and good results are obtained. Generally, the mol ratio of metal compound to activator will be in the range of from 1:10 to 10:1 when the metal compound is prereduced or is reduced by the activator.

The invention claimed is:

1. A process for producing a block polymer which comprises contacting, under polymerizing conditions, propylene with a catalyst comprising a dispersion of solid particles of a metal subhalide wherein said metal is selected from the group consisting of the metals of Groups IVa, Va and VIa of the Periodic Table according to Mendeleeff and an activator therefor selected from the group consisting of metal alkyls, metal hydrides, metal borohydrides, aryl metal halides, and alkyl metal halides wherein said metal is selected from the group consisting of aluminum, zinc, beryllium, chromium, magnesium, lithium, sodium, potassium, and lead, in an inert hydrocarbon liquid reaction medium, whereby said propylene is polymerized to form a polymeric block, then contacting a second monomeric composition selected from the group consisting of ethylene and mixtures thereof with propylene, with said catalyst system under polymerizing conditions whereby said second monomeric composition polymerizes in the presence of the previously formed polymeric block as a linear extension thereto, the polymerization of propylene being performed in the presence of sufficient hydrogen to give a melt index suitable for melt processing of the resulting block polymer and the polymerization of said second monomeric composition being performed in the substantial absence of added hydrogen, terminating the polymerization reaction and separating from the reaction mixture a solid, substantially crystalline block polymer which is predominantly insoluble in said reaction mixture at polymerization temperature and comprises molecules consisting essentially of a single homopolymer block linearly connected to a single polymer block selected from the group consisting of an interpolymer block and a homopolymer block derived from a monomer different from that of the first-mentioned homopolymer block, said block polymer consisting essentially of 99.8 to 40 weight percent of propylene and 0.2 to 60 weight percent of ethylene.

2. A process of claim 1 wherein said metal subhalide is a titanium subhalide and said activator is an alkyl aluminum halide.

3. The process of claim 2 wherein said aluminum compound is a dialkyl aluminum halide.

4. The process of claim 2 wherein said block polymer consists essentially of 97 to 40 weight percent of a propylene homopolymer block linearly joined to 3 to 60 weight percent of an ethylene homopolymer block.

5. The process of claim 4 wherein the reactor is vented to substantially remove hydrogen therefrom prior to polymerization of said second monomeric composition.

6. The process of claim 2 wherein said block polymer consists essentially of a single homopolymer block derived from propylene linearly joined to a single interpolymer block derived from a mixture of propylene and ethylene, said block polymer consisting essentially of 99.8 to 80 weight percent of propylene and 0.2 to 20 weight percent of ethylene.

7. The process of claim 6 wherein the propylene content of said block polymer ranges from 99.8 to 92 weight percent and the ethylene content of said block polymer ranges from 0.2 to 8 weight percent, and wherein the reactor is vented to substantially remove hydrogen therefrom prior to polymerization of said mixture of propylene and ethylene.

8. The process of claim 7 wherein said aluminum compound is a dialkyl aluminum halide.

9. The process of claim 1 wherein about 5 to 100 ppm hydrogen, based upon solvent weight, are present during said polymerization of propylene.

10. The process of claim 2 wherein about 5 to 100 ppm hydrogen, based upon solvent weight, are present during said polymerization of propylene.

* * * * *